United States Patent [19]
Hennessee et al.

[11] Patent Number: 5,547,125
[45] Date of Patent: Aug. 20, 1996

[54] VEHICLE CLIMATE CONTROL SYSTEM AND OPERATING METHOD

[75] Inventors: Robert P. Hennessee, Rochester Hills; Steven C. Huetteman, Canton; Ron M. Markowitz, West Bloomfield, all of Mich.

[73] Assignee: Chrysler Corporation, Auburn Hills, Mich.

[21] Appl. No.: 509,924

[22] Filed: Aug. 1, 1995

[51] Int. Cl.$^6$ .............................. F24F 7/00; G05D 23/00
[52] U.S. Cl. ........................ 236/49.3; 62/186; 236/91 C
[58] Field of Search ............................ 62/186; 236/49.3, 236/91 C; 165/43

[56] References Cited

U.S. PATENT DOCUMENTS 4,978,061  12/1990  Ogihara et al. ...................... 236/91 C
5,340,021   8/1994  Kajino et al. ......................... 236/49.3
5,427,313   6/1995  Davis, Jr. ............................. 236/91 C Primary Examiner—William E. Wayner
Attorney, Agent, or Firm—Roland A. Fuller, III

[57] ABSTRACT

An automatic climate control system for the passenger compartment of a motor vehicle includes an ambient temperature sensor, an vehicle-interior temperature sensor, a sunload sensor, a temperature selector by which a vehicle passenger may select a desired interior temperature, and a variable-speed blower fan for directing air into the passenger compartment. The operating speed of the blower fan is controlled by the system control unit so as to achieve the desired temperature within the passenger compartment while otherwise capitalizing on the temperature effects of the exterior environment, i.e., ambient temperature and sunload, to minimize blower fan noise and resultant directed airflow.

16 Claims, 1 Drawing Sheet

VEHICLE CLIMATE CONTROL SYSTEM AND OPERATING METHOD

TECHNICAL FIELD

The present invention generally relates to systems and methods for automatically controlling the interior temperature of a motor vehicle. More specifically, the invention relates to an improved vehicle climate control system and operating method which takes into account the natural heating and/or cooling effect of the exterior environment to minimize the speed at which the system's blower fan operates, thereby providing greater passenger comfort for a given desired interior temperature through a reduction in both fan noise and attendant directed airflow.

BACKGROUND OF THE INVENTION

Known systems for automatically controlling the interior temperature of a motor vehicle typically include a blower fan driven by a variable-speed motor for directing air into the passenger compartment. On its way to the passenger compartment, the thus-directed air passes first through the evaporator coil of a refrigeration system (the AC coil) and then either through a heater core or an air bypass, as selected by a variable-position "air mix door" or other suitable air-blending/diverting mechanism. Such known systems also typically include a first temperature sensor for sensing the "ambient" temperature outside of the vehicle; and a second temperature sensor for sensing the actual temperature within the interior of the vehicle, i.e., at a given location within the vehicle's passenger compartment. A control unit, which includes a control panel through which a vehicle passenger may select a desired interior temperature, controls the speed at which the blower motor is operated, the relative position of the air mix door, the operation of the refrigeration system's compressor and, possibly, the operation of a heater valve regulating the flow of engine cooling fluid through the heater core, whereby the relative quantity and temperature of the directed air is controlled with a view to obtaining the desired interior temperature within a prescribed time period.

Significantly, in such known systems, when providing such automatic climate control, the control unit will typically utilize a "base" fan operating speed, either as a preselected constant or, preferably, as a function of ambient (outside) temperature alone (this, due to the fact that the ability to maintain a relatively even temperature throughout the interior of the passenger compartment is most directly impacted by ambient temperature). The control unit will typically further employ a "proportional control" algorithm responsive to the difference between the desired internal temperature and the actual interior temperature both to provide a relative percent increase in fan speed above the base fan speed (thereby arriving at a first augmented fan speed) and to control the relative position of the air mix door.

Often, prior art systems further include a sunload sensor which generates an output representative of the sun's radiant heat transfer into the vehicle's passenger compartment. In such systems, the control unit will typically employ a second proportional control algorithm responsive to the output of the sunload sensor to generate another relative percent increase in fan speed above the base fan speed due to sunload (thereby arriving at a second augmented fan speed).

Apart from maintaining the interior temperature of the vehicle at or near the desired temperature as selected by the passenger, an automatic climate control system and operating method will ideally achieve the desired interior temperature in the same manner that a passenger might otherwise himself adjust a manually-operated climate control system. Unfortunately, in known systems, its control unit unvaryingly responds to the sensed ambient temperature-interior temperature difference and/or sunload so as only to augment the base fan speed. In this manner, such systems produce a response which is often different from that which a passenger might manually choose. Specifically, a passenger will manually seek to minimize fan noise and directed airflow when attempting to arrive at the desired interior temperature, factoring in, for example, the warming effects of a relatively higher/lower ambient temperature and sunload on the vehicle's interior temperature.

SUMMARY OF THE INVENTION

It is an object of the present invention to provide an automatic climate control system for a motor vehicle whose response more closely matches the manner in which a vehicle passenger might be expected to manually adjust a climate control system, particularly with respect to minimizing fan noise and attendant (and possibly discomforting) directed airflow.

In accordance with the present invention, a system for automatically controlling the temperature of the passenger compartment of a motor vehicle includes a first temperature sensor for generating an ambient temperature value based on the ambient air temperature, a second temperature sensor for generating an interior temperature value based on the temperature at a given location within the passenger compartment, and a passenger-operated a selecting means, such as a control panel, for generating a desired temperature value based on the passenger's selection of a desired interior temperature. The system also includes a means for directing air into the passenger compartment, which air-directing means includes a blower fan operative to direct air through a first passage into the passenger compartment, and a variable-speed blower fan motor which is itself responsive to a blower control signal.

In accordance with the present invention, the system further includes a control means for generating the blower control signal based on the ambient temperature value, the interior temperature value and the desired temperature value. Specifically, the control means first generates a base-fan-speed control signal derived from the ambient temperature value. The control means also generates a first relative percent increase value which is based on the relative difference between the interior temperature value and the desired temperature value. The first relative percent increase value is then adjusted downwardly towards zero as a function of the ambient temperature value, either when the desired temperature value exceeds the interior temperature value and the ambient temperature value increases above a first preselected threshold, or when the interior temperature exceeds the desired temperature value and the ambient temperature value decreases below a second preselected threshold. The control means thereafter increases the base control signal using the adjusted first relative percent increase value to obtain the required blower control signal.

In accordance with another feature of the present invention, in a preferred embodiment, the above system will further include a sunload sensor for generating a sunload value representative of radiant heat transfer into the passenger compartment. In this preferred embodiment, the control unit is also responsive to the sunload value so as to generate a second relative percent increase value based thereon, for subsequent multiplication with the base control signal and the adjusted first relative percent increase value in obtaining the blower control signal. Most preferably, the second relative percent increase value is itself adjusted downwardly towards zero responsive to the ambient temperature value when the interior temperature value exceeds the desired temperature value and the ambient temperature value is below a preselected threshold.

In accordance with another feature of the present invention, the system also includes a means responsive to a second, air-temperature control signal for varying the temperature of air directed through the first passage by the blower fan. Preferably, the second control signal is generated by the control means based on the relative difference between the interior temperature value and the desired temperature value.

Through adjustment of the degree to which the base control signal is increased in response to ambient temperature and sunload under certain circumstances, the present invention takes advantage of heat transfer into or out of the vehicle occurring in response to conditions external to the vehicle, i.e., an ambient temperature which is either greater or less than the desired internal temperature, respectively, as well as the sun's radiant heat transfer into the vehicle, when selecting an appropriate speed at which to drive the blower fan. In this manner, the present invention provides a reduced blower fan speed and, hence, a correlative decrease in fan noise and attendant airflow, without compromising system performance.

DETAILED DESCRIPTION OF THE PREFERRED EMBODIMENT(S)

Figure 1:
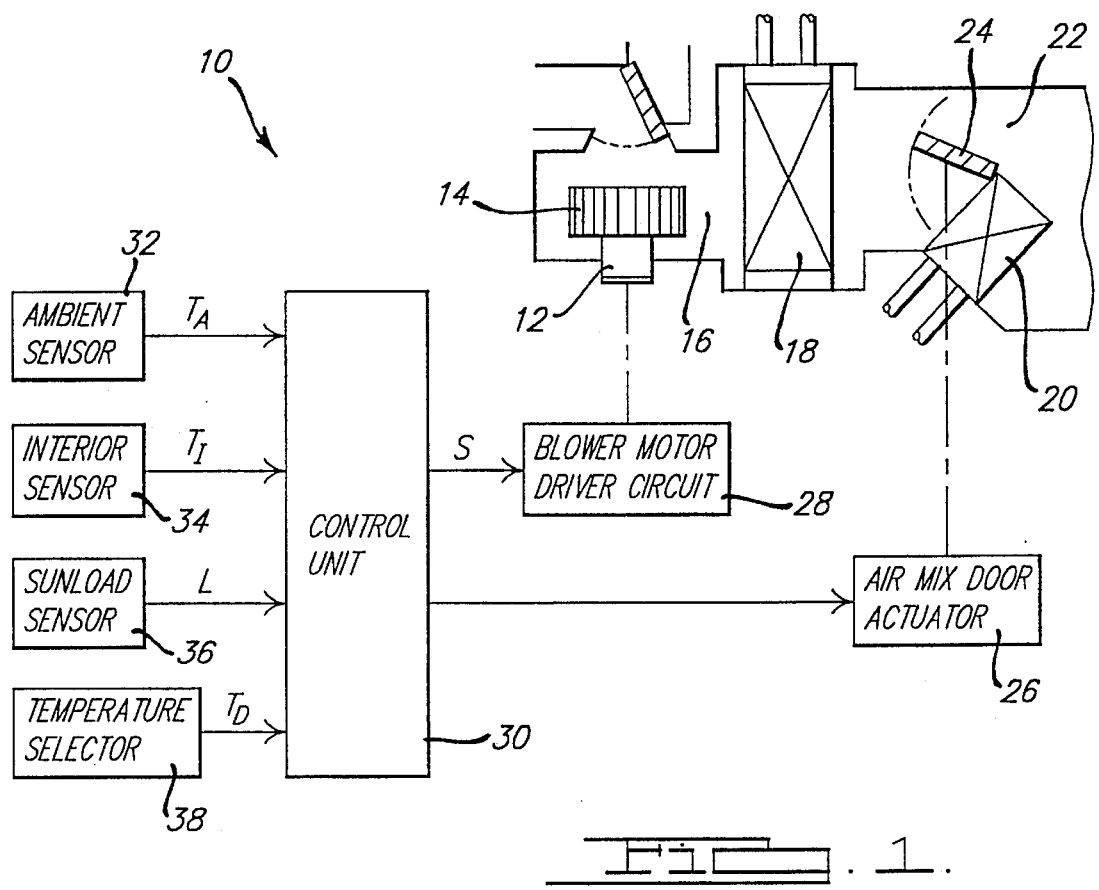
FIG. 1 is a schematic of an exemplary automatic climate control system for a motor vehicle in accordance with the present invention.

Referring to FIG. 1, an exemplary system 10 for automatically controlling the temperature within the passenger compartment of a motor vehicle (not shown) is illustrated schematically as including a variable-speed DC motor driving a blower fan 14, wherein the fan 14 operates to direct air along a first passage 16, through the evaporator coils 18 of a refrigeration system (the other parts of which are not shown), through a heater core 20 or bypass 22 (the airflow through either of which is controlled by the relative position of an air mix door 24 controlled by a suitable actuator 26), and into the passenger compartment. The blower motor 12 is itself controlled by a blower motor driver circuit 28 under the direction of a control unit 30, as will be further described below.

The system 10 further includes a first temperature sensor 32 for generating an ambient temperature value $T_A$ based on the temperature of the air outside the vehicle; a second temperature sensor 34 for generating an interior temperature value $T_I$ based on the interior temperature of the vehicle at one or more locations within the passenger compartment; and a sunload sensor 36 for generating a sunload value L based on a sensed amount of solar radiation reaching the interior of the vehicle. The system 10 also includes a temperature selector 38 located within the vehicle's passenger compartment by which a vehicle passenger can select a desired interior temperature $T_D$.

The system's control unit 30 generates a blower fan control signal S based on the ambient temperature value $T_A$, the interior temperature value $T_I$, the sunload value L and the desired interior temperature $T_D$ as selected by the vehicle passenger. Given that the ability of the present system 10 to maintain a relatively even temperature throughout the interior of the passenger compartment is most directly impacted by ambient temperature $T_A$, in accordance with the present invention, the control unit 30 first generates a base fan-speed control signal purely as a function of the ambient temperature value $T_A$. An appropriate algorithm with which to generate such a base control signal will be readily known to those skilled in the art and, hence, will not be further described herein.

In a manner also known to those skilled in the art, a first relative percent increase value is generated by the control unit 30 based on the relative difference between the desired temperature $T_D$ and the sensed interior temperature $T_I$, such that the first relative percent increase value increases as the relative temperature difference increases.

Figure 2:
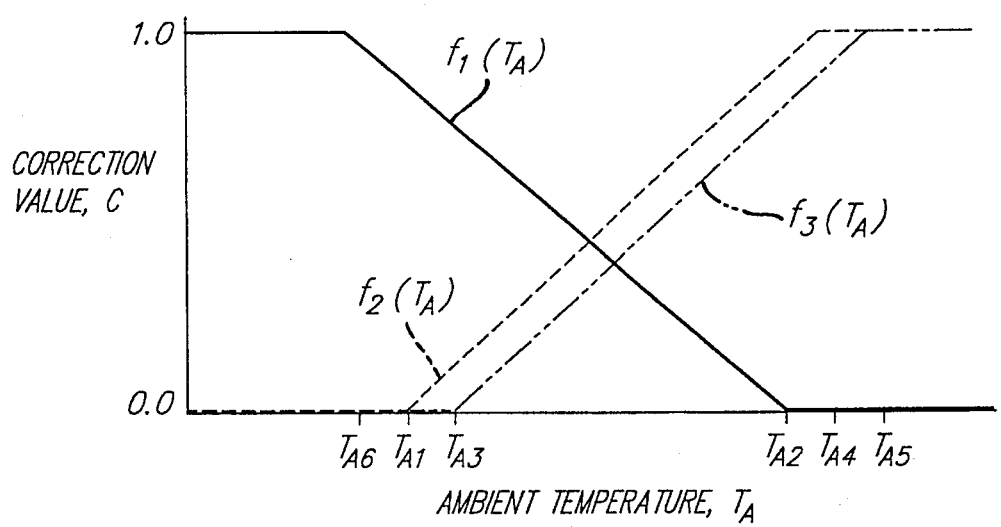
FIG. 2 is a plot of each of three exemplary functions for adjusting the relative percent increase values as a function of sensed ambient temperature, the first of which (indicated by the solid line) is to be used in adjusting the first relative percent increase value when the desired temperature exceeds the sensed interior temperature, the second of which (indicated by the dashed line) is to be used in adjusting the first relative percent increase value when the sensed interior temperature exceeds the desired temperature, and the third of which (indicated by the phantom line) is to be used in adjusting the second relative percent increase value when the sensed interior temperature exceeds the desired temperature.

In accordance with the present invention, the control unit 30 thereafter adjusts the first relative percent increase value based on the ambient temperature $T_A$ using either of two different functions, the selection of which depends upon whether or not the desired temperature $T_D$ exceeds the sensed interior temperature $T_I$. FIG. 2 contains a plot of each of two exemplary functions for adjusting the first relative percent increase value as a function of sensed ambient temperature $T_a$, as well as a third exemplary function for adjusting a second relative percent increase value as a function of sensed ambient temperature, as will be described further below (noting further that such functions may preferably be utilized by the system 10 by means of a lookup table stored in an EEPROM or other suitable memory device).

Specifically, the first function $f_1(T_A)$, plotted as a solid line in FIG. 2, is used to adjust the first relative percent increase value whenever the desired temperature $T_D$ exceeds the sensed interior temperature $T_I$, a condition also referred to herein as "sensor too cold." Thus, when the sensor is "too cold" and the ambient temperature drops below a certain minimum temperature ($T_{A1}$ on the abscissa), the correction value C with which to adjust the first relative percent increase value goes to "one" and, hence, the adjusted first relative percent increase value will be equal to the first relative percent increase value prior to its adjustment. In contrast, when the sensor is "too cold" and the ambient temperature rises to above a certain temperature ($T_{A2}$ on the abscissa), the correction value goes to "zero" and the first relative percent increase value is adjusted down to a zero value (stated another way, the first relative percent increase value generated as a result of the temperature difference alone will be nullified through its multiplication with a correction value equal to zero).

Similarly, the second function $f_2(T_A)$, plotted as a dashed line in FIG. 2, is used to adjust the first relative percent increase value whenever the sensed interior temperature $T_I$ exceeds the desired temperature $T_D$, i.e., when the sensor is itself "too hot." Referring to FIG. 2, it will be seen that, when the sensor is "too hot" and the ambient temperature drops below a certain minimum temperature ($T_{A3}$ on the abscissa), the correction value goes to zero and, hence, the first relative percent increase value will be adjusted down to zero. In contrast, whenever the sensor is "too hot" and the ambient temperature rises above a certain temperature threshold ($T_{A4}$ on the abscissa), the correction value will go to a value of "one" and, hence, the adjusted first relative percent increase value will remain equal to its prior value.

In a manner also well known to those skilled in the art, a second relative percent increase value is generated by the control unit 30 based on the sunload value L alone, such that the second relative percent increase value increases from zero as the sunload value increases. And, in accordance with the invention, the second relative percent increase value generated by the control unit 30 responsive to sunload alone is likewise adjusted downwardly as a function of the ambient temperature $T_A$, but only when the sensor is "too hot" and the ambient temperature $T_A$ is otherwise below a preselected threshold value $T_{A5}$.

By way of example, an exemplary third function $f_3(T_A)$ for use in adjusting the second relative percent increase value whenever the sensor is "too hot" is plotted as a phantom line in FIG. 2. As will be appreciated upon reference to FIG. 2, when the sensor is "too hot" and the ambient temperature drops below the preselected threshold $T_5$, the correction value C with which to adjust the second relative percent increase value begins to fall below 1.0 until it ultimately reaches a value of zero when the ambient temperature $T_A$ drops to a preselected minimum value $T_{A6}$ (whereupon the second relative percent increase value generated based on sunload alone will be nullified through its multiplication with a correction value equal to zero).

Finally, the base control signal generated by the control unit 30 is multiplied, i.e., augmented, by both the adjusted first relative percent increase value and the adjusted second relative percent increase value to obtain the desired blower control signal S. The blower control signal S is then used by the blower motor driver circuit 28 to provide a control voltage to the blower motor 12, whereupon the blower fan 14 provides the appropriate directed airflow through the first passage 22.

In this manner, the invention ensures lower fan operating speeds whenever ambient conditions provide advantageous heat transfer into or out of the vehicle. Indeed, by minimizing the speed at which the system's blower fan 14 is operated, the system 10 and method of the present invention essentially emulates the manner in which a vehicle passenger will manually lower fan speed to arrive at the desired interior temperature with correlatively less fan noise/airflow.

While the preferred embodiment of the invention has been disclosed, it should be appreciated that the invention is susceptible of modification without departing from the spirit of the invention or the scope of the subjoined claims.

We claim:

1. A system for automatically controlling the temperature of the passenger compartment of a motor vehicle, said system comprising:

a first temperature sensor for generating an ambient temperature value based on the ambient air temperature;

a second temperature sensor for generating an interior temperature value based on the temperature at a given location within the passenger compartment;

a desired-temperature selecting means operable by a passenger of the motor vehicle for generating a desired temperature value based on the passenger's selection of a desired interior temperature;

a means for directing air into the passenger compartment, said air-directing means including a blower fan operative to direct air through a first passage into the passenger compartment, and a variable-speed motor responsive to a blower control signal for driving the blower fan; and a control means for generating said blower control signal based on the ambient temperature value, the interior temperature value and the desired temperature value, wherein a base control signal is derived from the ambient temperature value, and a first relative percent increase value is derived from the relative difference between the interior temperature value and the desired temperature value, wherein the first relative percent increase value is adjusted downwardly towards zero responsive to the ambient temperature value and the absolute difference between the interior temperature value and the desired temperature, and wherein said base control signal is multiplied by the adjusted first relative percent increase value to obtain said blower control signal.

2. The system of claim 1, wherein the first relative percent increase value is adjusted downwardly towards zero as the ambient temperature value increases above a first preselected threshold only if the desired temperature value exceeds the interior temperature value.

3. The system of claim 2, wherein the first relative percent increase value is adjusted down to zero when the ambient temperature value increases above a second preselected threshold.

4. The system of claim 1, wherein the first relative percent increase value is adjusted downwardly towards zero as the ambient temperature value decreases below a third preselected threshold only when the interior temperature value exceeds the desired temperature value.

5. The system of claim 4, wherein the first relative percent increase value is adjusted down to zero when the ambient temperature value is below a fourth preselected threshold.

6. The system of claim 1, further including a sunload sensor for generating a sunload value representative of radiant heat transfer into the passenger compartment; and wherein said control means derives a second relative percent increase value based on the sunload value, and the base control signal is multiplied by both the adjusted first relative percent increase value and the second relative percent increase value to obtain said blower control signal.

7. The system of claim 6, wherein the second relative percent increase value is adjusted downwardly towards zero responsive to the ambient temperature value when the interior temperature value exceeds the desired temperature value and the ambient temperature value is below a fifth preselected threshold.

8. The system of claim 1, further including a means responsive to a directed-air temperature control signal for varying the temperature of air directed through the first passage by said air-directing means; and wherein said control means generates said directed-air temperature control signal, said directed-air temperature control signal being derived from the absolute difference between the interior temperature value and the desired temperature value.

9. A system for automatically controlling the temperature of the passenger compartment of a motor vehicle based, said system comprising:

a first temperature sensor for generating an ambient temperature value based on the ambient air temperature;

a second temperature sensor for generating an interior temperature value based on the temperature at a given location within the passenger compartment;

a sunload sensor for generating a sunload value representative of radiant heat transfer into the passenger compartment;

a desired-temperature selecting means operable by a passenger of the motor vehicle for generating a desired temperature value based on the passenger's selection of a desired interior temperature;

a means for directing air into the passenger compartment, said air-directing means including a blower fan operative to direct air through a first passage into the passenger compartment, and a variable-speed motor responsive to a blower control signal for driving the blower fan; and a control means for generating said blower control signal based on the ambient temperature value, the interior temperature value, the sunload value and the desired temperature value, wherein a base control signal is derived from the ambient temperature value, a first relative percent increase value is derived from the absolute difference between the interior temperature value and the desired temperature value, and a second relative percent increase value is derived from the sunload value, the first relative percent increase value being adjusted downwardly towards zero based on the ambient temperature value when the desired temperature value exceeds the interior temperature value and the ambient temperature value increases above a sixth preselected threshold, the first relative percent increase value alternatively being adjusted downwardly towards zero based on the ambient temperature value when the interior temperature value exceeds the desired temperature value and the ambient temperature value decreases below a seventh preselected threshold, the second relative percent increase value being adjusted downwardly towards zero based on the ambient temperature value only when the interior temperature value exceeds the desired temperature value and the ambient temperature value is below an eighth preselected threshold, and wherein said base control signal is multiplied by both the first relative percent increase value and the second relative percent increase value to obtain said blower control signal.

10. The system of claim 1, further including a means responsive to a directed-air temperature control signal for varying the temperature of air directed through the first passage by said air-directing means; and wherein said control means generates said directed-air temperature control signal, said directed-air temperature control signal being derived from the absolute difference between the interior temperature value and the desired temperature value, 11. In a climate control system for the passenger compartment of a motor vehicle having a blower fan driven by a variable-speed blower motor, a method for supplying a control voltage to the blower motor comprising the steps of:

receiving an input from a passenger of the motor vehicle representative of a desired temperature within the passenger compartment;

generating a desired temperature value based on said received passenger input;

detecting an ambient temperature outside the passenger compartment;

generating an ambient temperature value based on the detected ambient temperature;

detecting a temperature at a location within the interior of the passenger compartment;

generating an interior temperature value based on the detected interior temperature;

generating a base control signal based on the ambient temperature value;

generating a first relative percent increase value based on the absolute difference between the interior temperature value and the desired temperature value;

adjusting the first relative percent increase value downwardly towards zero responsive to the ambient temperature value and the relative difference between the interior temperature value and the desired temperature;

multiplying the base control signal with the adjusted first relative percent increase value to obtain a blower control signal; and generating the control voltage based on the blower control signal.

12. The method of claim 11, wherein the first relative percent increase value is adjusted downwardly towards zero as the ambient temperature value increases above a first preselected threshold and the interior temperature value exceeds the desired temperature value.

13. The method of claim 12, wherein the first relative percent increase value is adjusted down to zero when the ambient temperature value increases above a second preselected threshold.

14. The method of claim 11, wherein the relative percent increase value is adjusted downwardly towards zero as the ambient temperature value decreases below a third preselected threshold and the desired temperature value exceeds the interior temperature value.

15. The method of claim 14, wherein the relative percent increase value is adjusted down to zero when the ambient temperature value decreases below a fourth preselected threshold.

16. The method of claim 11, further including the steps of detecting an amount of solar radiation reaching the passenger compartment; generating a sunload value based on the detected amount of solar radiation; generating a second relative percent increase value based on the sunload value; and downwardly adjusting the second relative percent increase value towards zero responsive to the ambient temperature value when the interior temperature value exceeds the desired temperature value and the ambient temperature value is below a fifth threshold value; and wherein said multiplying step includes multiplying the base control signal with the adjusted first relative percent increase value and the adjusted second relative percent increase value to obtain the blower control signal.

* * * * *